E. P. BAUGH.
Treatment of Offal for Fertilizers.
No. 209,445. Patented Oct. 29, 1878.
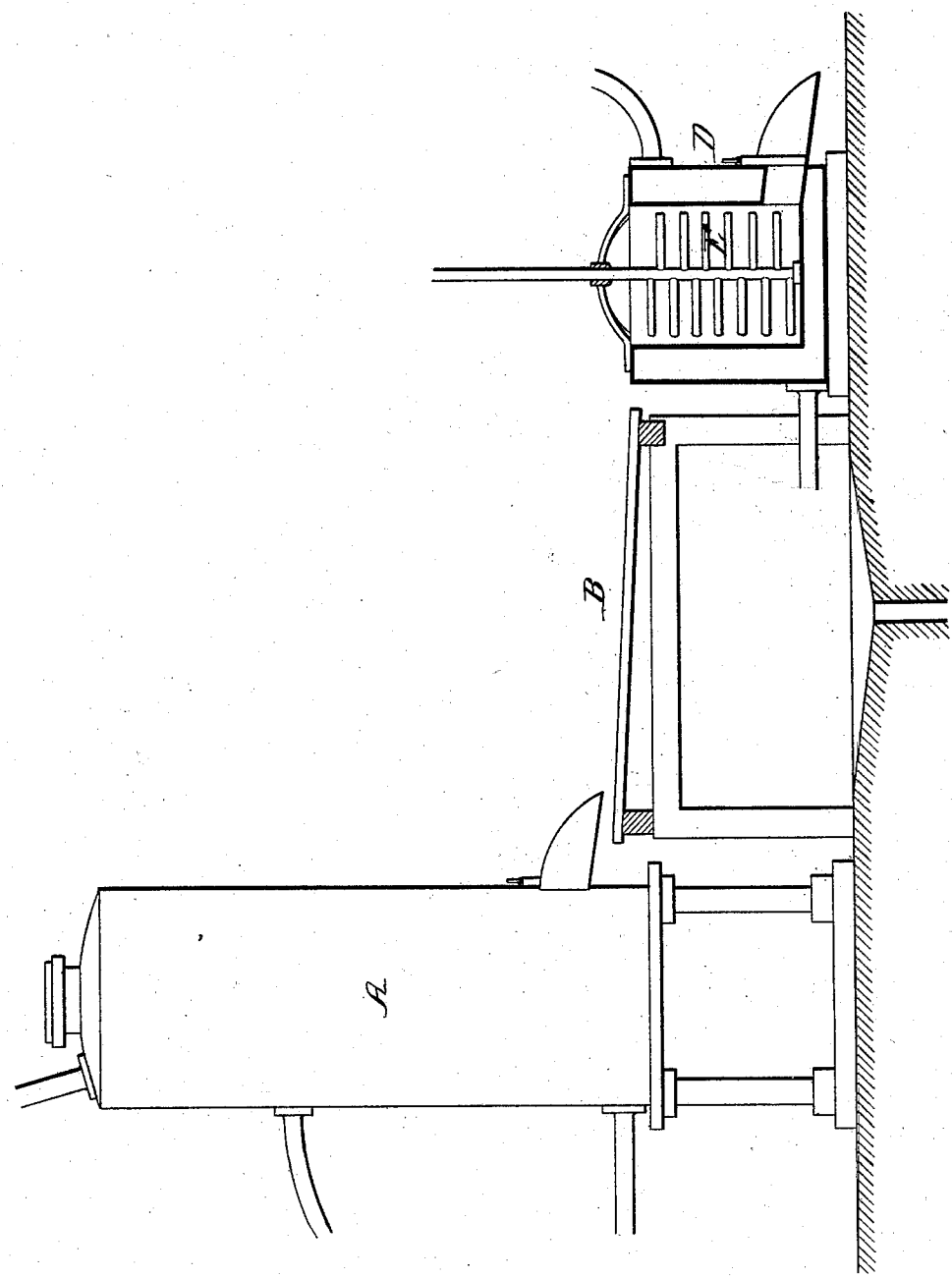
Witnesses,
Henry Howson Jr.
Harry Smith.
Inventor:
Edwin P. Baugh
by his Attorneys
Howson and Son

UNITED STATES PATENT OFFICE.

EDWIN P. BAUGH, OF PHILADELPHIA, PA., ASSIGNOR TO HIMSELF, JOHN P. BAUGH, AND DANIEL BAUGH, OF SAME PLACE.

IMPROVEMENT IN THE TREATMENT OF OFFAL FOR FERTILIZERS.

Specification forming part of Letters Patent No. 209,445, dated October 29, 1878; application filed September 30, 1878.

*To all whom it may concern:*

Be it known that I, EDWIN P. BAUGH, of Philadelphia, Pennsylvania, have invented a new and useful Improvement in Treatment of Offal Residuum, of which the following is a specification:

My invention relates to the residuum resulting from the treatment of animal offal in a tank for the extraction of lard, grease, &c.; and one object of my invention is to reduce the said residuum, after it leaves the tank, to the best condition for final extraction of the remaining grease by pressure more economically than heretofore; the other object being to obtain, as a final residuum, a richer manure ingredient than by the old process.

The figure in the accompanying drawing illustrates, partly in section, apparatus wherewith my invention may be carried into effect.

In order that my invention may be thoroughly understood and distinguished from the usual mode of extracting fatty matter from animal offal, it will be well to describe in the outset the present mode of treating the fresh offal of Western pork-butchering establishments, for the extraction of lard, and for obtaining a residuum useful as a manure ingredient. This fresh offal is deposited in a large rendering-tank, like that shown at A in the drawing, and is supported in the same by a perforated plate or screen near the bottom. The tank is then closed, and high-pressure steam is introduced into it, both above and below the offal.

Whatever lard is extracted by the action of the steam is withdrawn through suitable outlets, from time to time, until further extraction by the steam ceases. The residuum, consisting of bones, fleshy tissues, and other animal matter, with water and more or less lard, is then discharged into an open vat, and there boiled with water, from the surface of which the lard is skimmed, after which the residuum, while in a soft, pulpy condition, is pressed in bags, so as to extract the remaining lard, by apparatus similar to an ordinary oil-press, the contents of the bags, after pressure, being dried and used as a manure ingredient or applied to other uses.

The difficulties attending this plan result from the saturation of the residuum with water, and the more the residuum is saturated the greater is its bulk and the more tedious and expensive is it to press. In pressing this saturated residuum, moreover, much of the gelatinous and nitrogenous ingredients is washed away by, and carried off with, the water, and the value of the final residuum after pressure is decreased accordingly and the offensiveness of the residuum increased.

I obviate these difficulties in the manner which I will now proceed to describe, reference being had to the drawing.

Instead of discharging the residuum into an open tank, it is allowed to pass first onto a grating, B, where much of the water drips from it, after which it is deposited in a vessel, D, surrounded by a jacket, steam being admitted to the latter, so that the vessel shall be retained at a comparatively uniform heat. The vessel contains a stirring device, E, which may be similar to that of an ordinary pug-mill. In this vessel the residuum, with which is combined more or less water derived from the steam in the closed rendering-tank, is thoroughly agitated and brought into forcible contact with the steam-heated sides of the vessel. By this agitation, combined with the application of heat, the watery particles are dislodged, brought into contact with the sides of the vessel, and much of the water is evaporated. Whatever grease, moreover, may be contained in the fibrous tissues is dislodged therefrom, and the residuum is finally reduced in bulk, and becomes a comparatively thick mass, and is of a consistency best adapted for being pressed in order to extract the grease, which may be done without material loss of gelatinous and nitrogenous matter, the final residuum, after pressure, being less liable to become putrid and offensive, and being more valuable as a manure ingredient than the final residuum obtained in the old manner.

While all the grease is thus extracted and a superior manure product obtained, the operation of pressing is less tedious, owing to the diminution in the bulk of the residuum by the partial drying of the same in the vessel D.

It should be understood that I do not desire to confine myself to any specific devices or apparatus for agitating the residuum and subjecting it to heat, as many different appliances can be adopted for this purpose.

It should also be understood that, although I have referred to the treatment of fresh offal for the extraction of lard, the process may be adopted with great advantage in bone-boiling establishments.

I claim as my invention—

The process, substantially as herein set forth, of treating the residuum of fat-rendering tanks—that is to say, agitating the said residuum and exposing it to heat during agitation, after it leaves the main rendering-tank, and before it is subjected to pressure.

In testimony whereof I have signed my name to this specification in the presence of two subscribing witnesses.

EDWIN P. BAUGH.

Witnesses:
  HARRY A. CRAWFORD,
  HARRY SMITH.